US005569522A

United States Patent [19]

Steininger et al.

[11] Patent Number: 5,569,522

[45] Date of Patent: Oct. 29, 1996

[54] ANTICOPYING FILM

[75] Inventors: Helmut Steininger, Worms, Germany; Alan Green, Royston, Great Britain; Michel Munch, Illkirch-Graffenstaden, France; Peter Heilmann, Bad Duerkheim, Germany

[73] Assignee: BASF Magnetics GmbH, Mannheim, Germany

[21] Appl. No.: 293,953

[22] Filed: Aug. 24, 1994

[30] Foreign Application Priority Data

Aug. 24, 1993 [DE] Germany .......................... 43 28 413.2

[51] Int. Cl.[6] ........................................................ B32B 3/00

[52] U.S. Cl. ............................ 428/195; 428/29; 428/198; 428/203; 428/411.1; 428/488.4; 428/913; 428/914; 283/72; 283/100; 283/107; 283/110

[58] Field of Search .............................. 428/29, 195, 198, 428/203, 411.1, 488.4, 913, 914; 427/195; 283/72, 100, 107, 16, 902

[56] References Cited

U.S. PATENT DOCUMENTS

| | | | |
|---|---|---|---|
| 3,887,742 | 6/1975 | Reinnagel et al. | 428/211 |
| 4,025,673 | 5/1977 | Reinnagel | 428/29 |
| 4,184,700 | 1/1980 | Greenaway | 283/6 |
| 4,303,307 | 12/1981 | Tureck et al. | 350/276 R |
| 4,786,084 | 11/1988 | Karney et al. | 283/91 |

*Primary Examiner*—Patrick J. Ryan
*Assistant Examiner*—William A. Krynski
*Attorney, Agent, or Firm*—Keil & Weinkauf

[57] ABSTRACT

An anticopying film (2) for covering documents (1) appears opaque in vertical plan view (5) as a result of total reflection for protection against copying and appears transparent in the oblique viewing direction (6), the film having an irregular sawtooth structure (3). This makes it virtually impossible to produce an identical second film with the aid of which, by placing said second film on top, the effect of the anticopying film (2) might be eliminated.

8 Claims, 3 Drawing Sheets

ANTICOPYING FILM

BACKGROUND OF THE INVENTION

1. Field of the Invention

The present invention relates to an anticopying film for copying documents, consisting of a film which comprises a transparent material, has a size corresponding to that of the document to be covered or of parts thereof and, as a result of a sawtooth-like structure, has defined regions of a medium optically thinner than the film material, said regions facing the document to be covered, so that the film appears opaque in an angular range corresponding to the plan view, owing to total reflection at the saw-tooth-like interface, and appears transparent when viewed in angular ranges differing therefrom.

2. Description of the Prior Art

U.S. Pat. No. 3,887,742 describes an anticopying film of the type defined above. The film which is intended to render documents uncopiable consists of transparent plastics film which has a sawtooth-like structure. The region formed by the structure contains an optically thinner medium which is defined either by the material and document or entirely by the material. Owing to the total reflection which occurs as a result of the structure in the angular range of exposure of a copier, the film appears opaque during the copying process but transparent in an angular range differing therefrom, for example during reading.

This anticopying film has the disadvantage that the copy protection can be overcome by superposing a second anticopying film which is at least roughly coincident with the anticopying film.

SUMMARY OF THE INVENTION

It is an object of the present invention to provide an anticopying film in which the effectiveness of the copy protection cannot be eliminated.

We have found that this object is achieved by an anticopying film of the type described at the outset, in which, according to the invention, the sawtooth-like structure is irregular at least in parts.

BRIEF DESCRIPTION OF THE DRAWINGS

The anticopying film according to the invention is described below in detail with reference to the embodiments shown in the drawing.

DESCRIPTION OF THE PREFERRED EMBODIMENT

Figure 1:
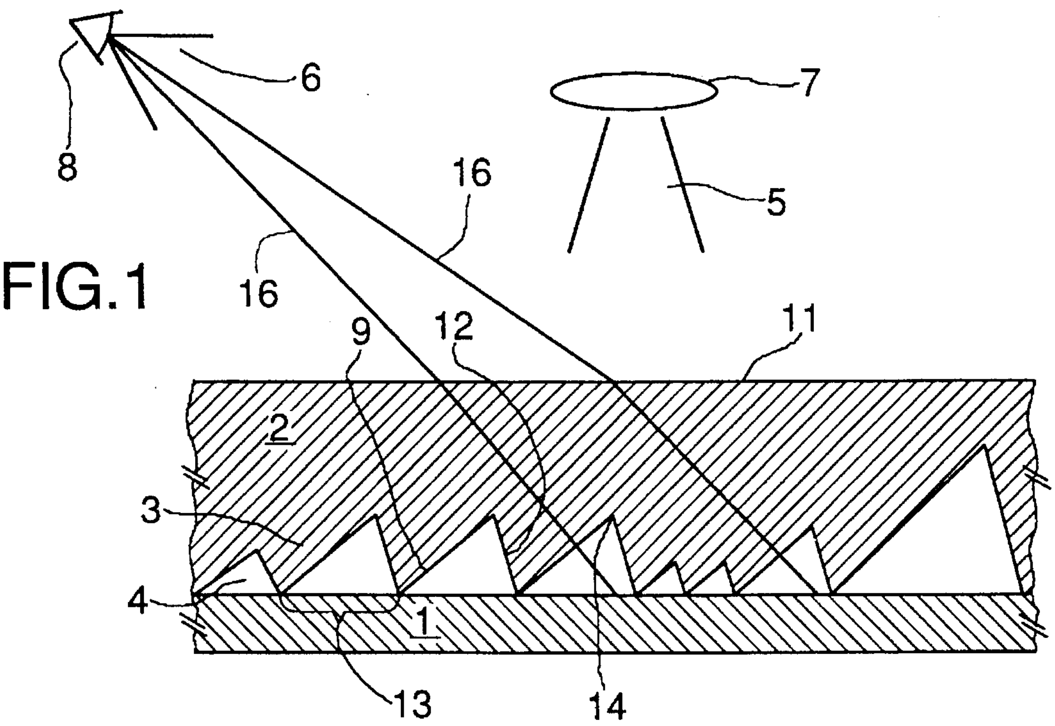
FIG. 1 shows a cross-section through an anticopying film which is applied to a document and has a sawtooth structure adjacent to the document.

The embodiment in FIG. 1 shows a sawtooth structure 3 which is adjacent to the document 1 and has different symmetries in the upward slope 9 and downward slope 12 of the tooth system, mainly asymmetrical and with an upward slope of the flanks 9 which is at right angles to the beam path. This permits a viewer 8 to obtain a complete view of the document 1 in an angular range 6.

The uselessness of copies of the document 1 arises through total reflection at the interfaces with the optically thinner medium 4 in an angular range 5 which corresponds to that of a conventional photocopier 7. It it not necessary, as in the publication cited at the outset, for the sawtooth structure 3 to be symmetrical and uniform with regard to length of period 13, depth 14 of the structure, upward slope 9 and downward slope 12 of the flanks. It may vary in these parameters. The greater copying security is achieved by virtue of the fact that the length of period 13 of the sawtooth structure 3 is randomly distributed and preferably short. The depth 14 of the structure 3 varies randomly around certain values, a small depth being preferred in order to keep the film thickness very small and to optimize the imaging quality. The upward slope 9 and downward slope 12 of the sawtooth flanks vary relative to the beam path of the direction of observation, an arrangement at right angles or parallel thereto giving the optimum imaging quality. This results in an aperiodic variation in the length of period, the depth and the symmetry. In these regions at least, it is sufficient to have total reflection, with the result that severe distortions of the document or blackened areas occur in the copy and the latter is therefore useless. With the film according to the invention, there is now no longer any possibility of overcoming the copying protection by placing an appropriate second film on top, since the random distribution of these parameters prevents the production of such a second film. The document therefore cannot be copied with sufficient quality.

Figure 2:
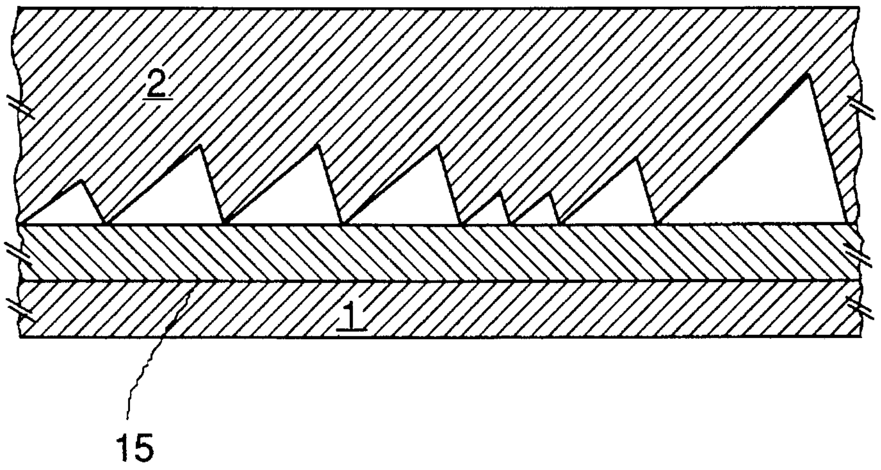
FIG. 2 shows a cross-section through an anticopying film which is applied to a document and has a sawtooth structure inside the film.

The embodiment according to FIG. 2 comprises a modification of the structure such that the sawtooth structure 3 is now completely enclosed by the film material 2, ie. is internal. Document 1 can now more advantageously be applied to a flat surface 15.

Figure 3:
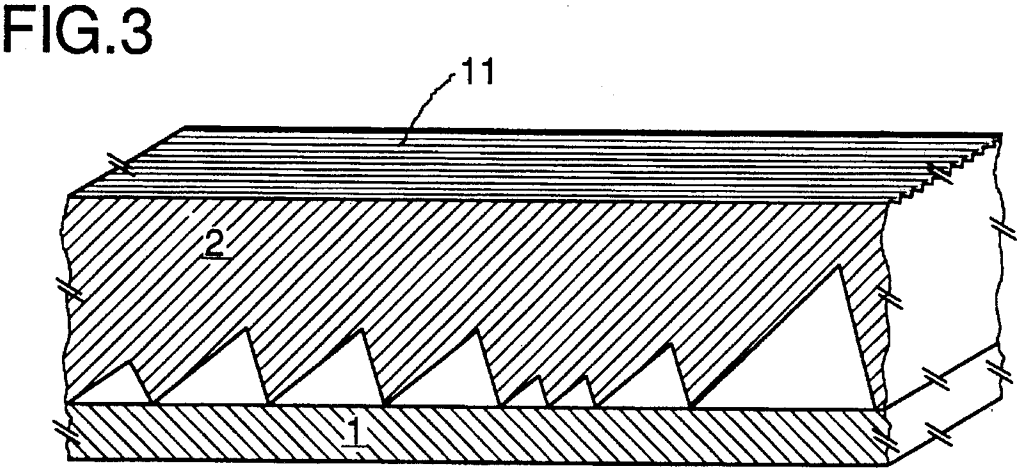
FIG. 3 shows a perspective view of an anticopying film which is applied to a document and whose surface is roughened.

The embodiment according to FIG. 3 comprises a modification of the film such that the surface 11 of the film 2 is roughened preferably at right angles to the sawtooth structure 3. This ensures that the effectiveness of the copying protection cannot be eliminated even when the sawtooth structure 3 is symmetrical. The copying protection is thus effectively maintained despite a second, almost coincident anticopying film.

Figure 4:
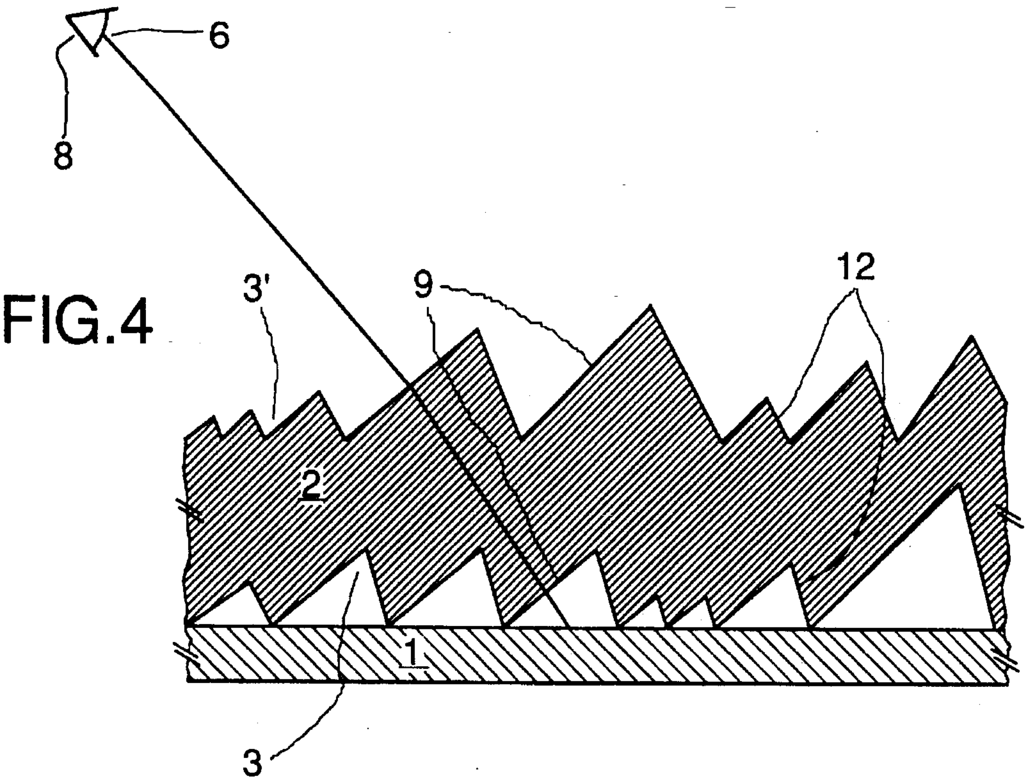
FIG. 4 shows a cross-section through an anticopying film which is applied to a document and contains a sawtooth-like structure on both sides of the film.

The embodiment according to FIG. 4 describes an anticopying film in which the imaging capability of the film 2 is optimized for the viewer 8 by means of a sawtooth structure 3, 3' on both sides. This is achieved by virtue of the fact that the ascending flanks 9 of the sawtooth are virtually at right angles to the beam path. The beam is not deflected, and the viewer 8 can view the document without losses of intensity due to partial reflection and aberrations of the document 1 as a result of refraction. Total reflection, which distorts the document 1 or blackens the copy by reflection of the copying light and thus makes the copies useless occurs at least in areas.

Figure 5:
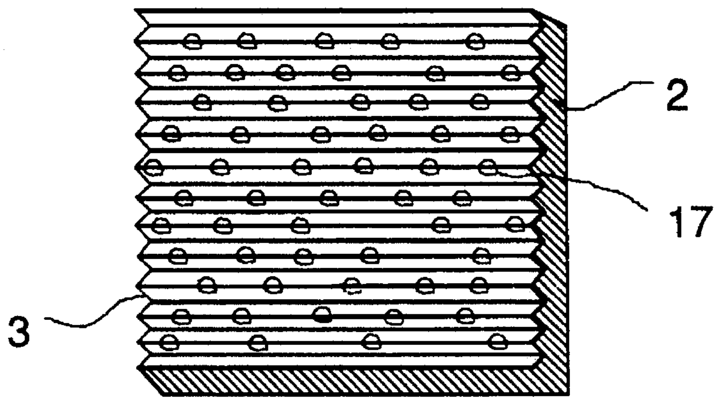
FIG. 5 shows an anticopying film in which adhesive is distributed in the form of points on the side which faces the document.
Figure 6:
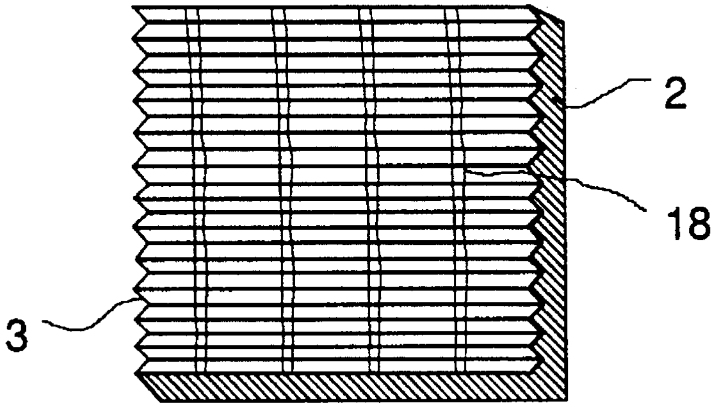
FIG. 6 shows an anticopying film in which adhesive is distributed in the form of strips on the side facing the document.

The embodiments in FIGS. 5 and 6 constitute an anticopying film in which adhesive 17, 18 is present on that side of the anticopying film 2 which faces the document, in order to fix the film to the document 1. Since the copying protection is based on total reflection at the interfaces of the sawtooth 3, where there is an inevitable abrupt change in refractive index, it is not possible to apply the adhesive freely. Adhesive is preferably applied only over parts of the area, in particular in the form of points (FIG. 5) or strips (FIG. 6). In the embodiment in FIG. 5, the adhesive points 17 are randomly distributed and applied with low density, preferably $0.15 \cdot mm^{-2}$, and small size, preferably 0.5·mm. In the embodiment in FIG. 6, the spacing of the strips 18 is small, preferably 15 mm. The strips, which are also about 0.5 mm wide, are transverse to the direction of the sawtooth, preferably at an angle of 90°. Consequently, the total reflection is eliminated only in regions of the adhesive coat, which are not cohesive owing to the particular shape and distribution, so that copying once does not reproduce a complete text.

The anticopying film according to the invention makes it possible to increase the copying security and at the same time to enhance the legibility of the document covered therewith.

We claim:

1. An anticopying film for covering documents, consisting of a transparent film having top and bottom surfaces which has on its bottom surface a sawtooth structure facing the document to be covered, said film comprising a material having a first optical index of refraction comprising its sawtooth structure and a material having a second, different optical index of refraction filling the space between the sawteeth of said sawtooth structure, whereby in a first viewing angle relative to the top film surface said film appears opaque owing to a total reflection at the interface of the materials having the first and second optical indices of refraction, and appears transparent in a second viewing angle relative to the top film surface, wherein the sawtooth structure appears in cross-section as a series of triangles whose base lines are all parallel, whose angles are all identical, but whose areas vary randomly in magnitude.

2. An anticopying film as claimed in claim 1, wherein the sawtooth structure has subsequently arranged groups of triangles with an equal area content.

3. An anticopying film as claimed in claim 1, wherein said top film surface also possesses a sawtooth structure similar to that of the bottom film surface.

4. An anticopying film as claimed in claim 1, wherein the top surface of the film is roughened in a direction at right angles to the sawtooth structure.

5. An anticopying film as claimed in claim 1, wherein an adhesive is applied at random points to the bottom surface of the film.

6. An anticopying film as claimed in claim 1, wherein an adhesive (18) is applied in the form of strips to the bottom surface of the film, transversely to the direction of the sawtooth structure.

7. An anticopying film as claimed in claim 2, wherein said top film surface also possesses a sawtooth structure similar to that of the bottom film surface.

8. An anticopying film as claimed in claim 1, wherein one of the sides of the series of triangles is roughly perpendicular to the second viewing angle.

* * * * *